United States Patent Office 3,480,508
Patented Nov. 25, 1969

3,480,508
METHOD FOR IMPROVING THE PHYSICAL AND CORD-ADHESION PROPERTIES OF NATURAL RUBBER OR STYRENE-BUTADIENE RUBBER
Hrishikesh Chandra Roy, Grafelfing, near Munich, Germany, assignor to Metzeler AG, Munich, Germany
No Drawing. Continuation of application Ser. No. 308,330, Sept. 12, 1963. This application June 15, 1967, Ser. No. 646,428
Claims priority, application Germany, Oct. 17, 1962, M 54,533
Int. Cl. B32b 25/12, 25/16
U.S. Cl. 161—227
19 Claims

ABSTRACT OF THE DISCLOSURE

Adhesion of tire cord to rubber is improved by the inclusion of dibenzothiazyldisulfide, mercaptobenzothiazol, tetramethylthiuram-disulfide and a quinone dioxime in the rubber vulcanization recipe.

---

This application is a continuation of Serial No. 308,330, filed Sept. 12, 1963, now abandoned.

This invention relates to a mixture for improving the physical and cord-adhesion properties of natural rubber, styrene butadiene rubber, oil stretched styrene-butadiene rubber, 1,4-cis-isoprene and 1,4-cis-polybutadiene rubber which alone or blended in pairs of several blended together—are mixed with the usual substances, such as plasticizer, zinc, oxide, stearic acid, adhesive, decomposition agent, wax, sulphur, carbon black and anti-aging agents.

The above defined mixtures, to which the invention relates, are suitable as carcase mixtures for tires, on account of their resistance to heat at approximately 130° C., and give improved adhesion to nylon and cord when impregnated with resorcin formaldehyde solution and vinyl pyridine latex on account of the resultant chemical bond. From this point of view alone the complexity and the difficulty of the problem is apparent. Any one engaged on the solution of such problems knows how confusing they are, on the one hand and on the other hand, how seriously measures to improve tires are necessary. The problem of the development of heat-resistant mixtures is the same both for nylon cord and for rayon cord. It is only that the adhesive property is very different with each kind of cord. The adhesion problem mixtures of rayon cord is solved to a great extent by known methods, whereas, in the case of nylon cord it is much more a question of a problem which has remained unsolved to a greater degree. Although various works have already been published on the adhesion problem of nylon cord, no substantially improved adhesion of nylon was achieved by impregnating the nylon cord with resorcin formaldehyde solution and vinyl pyridine latex. Special difficullties in respect of adhesion occur at the cut ends of webs of fabric and the ends of threads of nylon cord. The adhesion can be improved by the so-called isocyanate methods, but this is not easy to put into practice in industry. The standard method for the treatment of nylon cord which is used at present in industry is therefore still impregnation thereof with resorcin formaldehyde solution and vinyl pyridine latex.

The other problem of developing heat resistant rubber mixtures, particularly those employing natural rubber, for running surfaces and carcass quality, is occupying experts all over the world and has already led to many successes which, however, particularly together with good adhesion properties of these mixtures on nylon cord and the like, have never been completely satisfactory. Tests for aging of rubber vulcanisates for the running surface and carcass qualities of tires is normally carried out for seven days continuously at 70° C. These testing conditions are unsatisfactory for the requirements made to-day of industrial vehicle tires, since the running temperature of such tires at the shoulder rises to approximately 100–130° C. Therefore it is necessary to age and to test the appropriate mixtures for three days together at least at 100° so that the resultant value can be compared with the test result found after the tires have been used in practice. Viewed under these conditions the physical values of rubber vulcanisates of all conventional mixtures are rather poor after the aging of all possible tires.

It has been found that very highly heat resisting rubber vulcanisates suitable for carcass mixtures and a good nylon cord adhesion corresponding to such heat resistance compared with the mixture, is achieved by an addition of stabilised phenol formaldehyde resin with active methylol group and/or nitrogen containing substances in the mixture. A mixture composed in this manner is considerably improved if its vulcanisation system contains portions of di-benzo-thiazyl-disulphide mercapto-benzo - thiazol and tetramethyl - thiuram-disulphide. pp' - Dibenzoylquinone dioxime and paraquinone dioxime have proved to be particularly suitable nitrogen-containing substances.

In the following Example I two mixtures I and II to known standard qualities with the associated test results are shown as a basis for comparing the following other mixtures.

Mixture I refers to a carcass mixture and mixture II to a mixture for reinforcement belts or so-called breakers.

EXAMPLE I

| Formula | Mixtures | |
|---|---|---|
| | I | II |
| Natural rubber (Borneo II) | 100 | 01 |
| Natural rubber (Para II 14K) | 0 | 100 |
| Plasticiser (naphthalene) | 5 | 5.5 |
| Zinc oxide (zinc 1 RS) | 10 | 10 |
| Stearic acid (Stearin P) | 2 | 3 |
| Phenylbetanaphthylamine (phenyl-beta) | 0.75 | 1 |
| N-phenyl-N'-isopropyl-p-phenylene diamine (Antioxidant age resistor 4010 NA) | 0.75 | 1 |
| Condensation product of tertiary butyl phenol with acetylene peptizer (Renazit IV gran) | 0.15 | 0.14 |
| Carbon black (Carbon black Dixi 77.) | 20 | 43 |
| Semi-active carbon black Durex 0 | 20 | 0 |
| Oil sulphur, 0.2 | 2.2 | 1.65 |
| Oil sulphur Chrystex (20 parts oil) | 1.2 | 1.8 |
| N-oxydiethylbenzothiazyl-sulphene amide (Santocure MOR) | 1.1 | 1.1 |

EXAMPLE I.—Continued

| Test results | I | | II | |
|---|---|---|---|---|
| | Heating at 143° C. | | | |
| | 35' | 60' | 35' | 60' |
| Modulus with 300% | 92 | 80 | 122 | 111 |
| Modulus with 500% | 201 | 176 | | |
| Tensile strength | 210 | 191 | 161 | 170 |
| Breaking tension | 505 | 520 | 365 | 395 |
| Shore hardness | 55 | 55 | 59 | 58 |
| Elasticity | 49 | 43 | 48 | 3 |
| Notch toughness | | | 10 | 14 |
| Pulling out strength | | | 64 | 73 |

Aging three days at 100° C.

| Test results | I | | II | |
|---|---|---|---|---|
| | Heating at 143° C. | | | |
| | 35' | 60' | 35' | 60' |
| Modulus with 300% | | | | |
| Modulus with 500% | | | | |
| Tensile strength | 71 | 87 | 31 | 38 |
| Breaking tension | 185 | 235 | 85 | 115 |
| Shore hardness | 61 | 58 | 65 | 63 |
| Elasticity | 45 | 43 | 45 | 45 |
| Notch toughness | | | 6 | 8 |
| Pulling out strength | | | 27 | 26 |

| | I | | | |
|---|---|---|---|---|
| | Carcass mixture | | | |
| Cord adhesion (static) kg./cm. thread length | Rayon | Nylon | Nylon bare | Cord adhesion (dynamic) |
| Calculated at room temperature, unaged (heated for 2 hours, 15 minutes) | 9.37 | 12.2 | 2.74 | $1.9 \times 10^4$ |
| Calculated at room temperature, age (heated for 2 hrs., 15 mins., 5 hrs. at 130° C.) | 7.11 | 10.8 | 2.89 | $0.2 \times 10^4$ |
| Calculated at room temperature, aged 24 hrs. at 100° C | 9.91 | 12.0 | 3.5 | |
| Calculated at 100° C., unaged | 6.97 | 9.8 | 2.03 | |

| | II | | | |
|---|---|---|---|---|
| | Breaker | | | |
| Cord adhesion (static) kg./cm. thread length | Rayon | Nylon | Nylon bare | Cord adhesion (dynamic) |
| Calculated at room temperature, unaged (heated 2 hrs., 15 mins.) | 11.83 | 10.54 | | |
| Calculated at room temperature, aged 5 hrs. at 130° C | 9.54 | 9.46 | | |
| Calculated at room temperature, aged 24 hrs. at 100° C | 11.03 | 10.69 | | |
| Calculated at 100° C., unaged | 10.71 | 8.09 | | |

EXAMPLE II

| | Mixtures | |
|---|---|---|
| | III | IV |
| Natural rubber (Para II) | 25 | 25 |
| Natural rubber (Borneo II) | 25 | 25 |
| Synthetic styrlbutadiene rubber (Polysar 41 Krylene) | 50 | 50 |
| Plasticizer (naphthelene) | 5 | 5 |
| Zinc oxide (Zinc special) | 3 | 3 |
| Stearic acid (Stearine P) | 2 | 2 |
| N-phenyl-N'-cyclohexyl-p-phenylenediamine (Aldal 4010) | 1 | 1 |
| Phenylbetanaphthylamine (Phenyl-beta Sch) | 0.6 | 0.6 |
| Phenylalphanaphtylamine (Phenyl-alpha) | 0.35 | 0.35 |
| Peptizer (Renazit IV gran) a peptizer, the zinc salt of pentachlorothiophenol | 0.06 | 0.06 |
| Wax (Ozokerit P) | 1 | 1 |
| Condensation product of tertiary butyl phenol with acetylene (KO resin) | 1.5 | 1 |
| Semi-active carbon black (Carbon black E) | 20 | 0 |
| Furnace carbon black (Corax 3) | 20 | 43.5 |
| Mercaptobenzimidazol (MB) | 1 | 1 |
| Oil sulphur, 0.2 | 0.55 | 0.55 |
| Stabilised phenolformaldehyde resin with active methanol group (Ambersol St. 137) | 1 | 1 |
| Dibenzothiazyldisulphide (Vulkazit M) | 2 | 2 |
| Mercaptobenzothiazol (Vulkazit C) | 0.5 | 0.5 |
| Tetramethylthiuramdisulphide (Vulkazit Th) | 0.1 | 0.1 |
| pp'-Dibenzoylquinonedioxime (Dibenzo GMF) | 1.5 | 1.5 |

| Test results | III | | IV | |
|---|---|---|---|---|
| | Heating at 143° C. | | | |
| | 30' | 60' | 30' | 60' |
| Modulus with 300% | 63 | 65 | 83 | 84 |
| Modulus with 500% | 124 | 127 | 178 | 178 |
| Tensile strength | 174 | 160 | 202 | 200 |
| Breaking tension | 625 | 990 | 555 | 555 |
| Shore hardness | 53 | 55 | 59 | 60 |
| Elasticity | 53 | 51 | 45 | 46 |
| Notch toughness | 12 | 9 | 65 | 83 |
| Pulling out strength | 50 | 88 | 65 | 83 |

EXAMPLE II.—Continued

Aging three days at 100° C.

| | III | | IV | |
|---|---|---|---|---|
| | Heating at 143° C. | | | |
| Test results | 30′ | 60′ | 30′ | 60′ |
| Modulus with 300% | 80 | 78 | 115 | 107 |
| Modulus with 500% | | | | |
| Tensile strength | 145 | 140 | 188 | 189 |
| Breaking tension | 480 | 495 | 440 | 460 |
| Shore hardness | 55 | 55 | 61 | 60 |
| Elasticity | 54 | 53 | 48 | 48 |
| Notch toughness | 6 | 6 | 20 | 35 |
| Pulling out strength | 32 | 35 | 42 | 42 |

Aging three days at 130° C.

| | III | | IV | |
|---|---|---|---|---|
| | Heating at 143° C. | | | |
| Test results | 30′ | 60′ | 30′ | 60′ |
| Modulus with 300% | 82 | 86 | | 124 |
| Modulus with 500% | | | | |
| Tensile strength | 98 | 97 | 124 | 128 |
| Breaking tension | 320 | 345 | 285 | 305 |
| Shore hardness | 57 | 56 | 62 | 62 |
| Elasticity | 48 | 47 | 43 | 43 |
| Notch toughness | 5 | 7 | 26 | 8 |
| Pulling out strength | 29 | 29 | 32 | 37 |

| | III | IV | IV(v) |
|---|---|---|---|
| Cord adhesion (static) | Carcass nylon | Breaker rayon | Nylon bare |
| Calculated at room temperature, unaged (heated 2 hrs., 15 mins.) | 11.91 | 11.26 | 3.9 |
| Calculated at room temperature, aged 5 hrs. at 131° C | 11.03 | 10.11 | 3.2 |
| Calculated at room temperature, aged 24 hrs. at 100° C | 11.77 | 10.71 | 2.45 |
| Calculated at 100° C., unaged | 8.37 | 9.77 | 3.2 |

EXAMPLE III

| | Mixtures | |
|---|---|---|
| | V | Va |
| Mercaptobenzimidazol (white MB) | | 1 |
| Natural rubber | 70 | 70 |
| 1,4-cis-polybutadiene rubber | 30 | 30 |
| Plasticizer (naphthalene) | 5.5 | 6 |
| Zinc oxide | 5 | 3 |
| Stearic acid | 3 | 2 |
| Adhesive (Koresin) | 1 | 1 |
| Phenylbetanaphthylamine (phenyl-beta) | 1 | 0.6 |
| Phenylalphanaphthylamine (phenyl-alpha) | | 0.35 |
| N-phenyl-N′-isopropyl-p-phenylene-diamine(Antioxydant 4010 NA) | 1 | 1 |
| Decomposing (Reazit IV) agent | 0.14 | 0.15 |
| Furnace (Corax 3) carbon black | 43 | |
| Furnace (Corax A) carbon black | | 40 |
| Oil sulphur, 0.2 | 0.55 | 0.77 |
| Dibenzothiazyldisulphide (Vulkazit M) | 2 | 2.6 |
| Mercaptobenzothiazol (Vulkazit C) | 0.5 | 0.5 |
| Tetramethylthiuramdisulphide (Vulkazit Thiuram) | 0.1 | 0.1 |
| pp′-Dibenzoylquinonedioxime (Dibenzo GMF) | 1.5 | 1.5 |
| Stabilised phenolformaldehyde resin with active methol group (Amberol St 137) | 1 | 1 |
| Total | 165.29 | 161.57 |

| | V | | | |
|---|---|---|---|---|
| | Heating at 143° C. | | | |
| Test Results | 10′ | 15′ | 35′ | 60′ |
| Modulus with 300% | 75 | 60 | 102 | 116 |
| Modulus with 500% | 168 | 81 | | |
| Tensile strength | 195 | 174 | 195 | 182 |
| Breaking tension | 585 | 515 | 525 | 485 |
| Store hardness | 59 | 55 | 64 | 60 |
| Elasticity | 52 | 52 | 57 | 57 |
| Notch toughness | 16 | 35 | 16 | 16 |
| Pulling out strength | 79 | 73 | 81 | 62 |

Aging three days at 100° C.

| | V | | | |
|---|---|---|---|---|
| | Heating at 143° C. | | | |
| Test results | 10′ | 15′ | 35′ | 60′ |
| Modulus with 300% | 126 | 110 | 144 | 130 |
| Modulus with 500% | | | | |
| Tensile strength | 168 | 168 | 168 | 138 |
| Breadking tension | 360 | 410 | 330 | 330 |
| Shore hardness | 64 | 66 | 65 | 65 |
| Elasticity | 58 | 59 | 60 | 58 |
| Notch toughness | 11 | 12 | 10 | 10 |
| Pulling out strength | 31 | 22 | 43 | 41 |

EXAMPLE III.—Continued

|  | Cord adhesion (static) kg./cm. thread length | | Cord adhesion (dynamic) Va |
|---|---|---|---|
|  | V nylon | Va |  |
| Calculated at room temperature, unaged (heated 2 hrs., 15 mins.) | 12.03 | 11.9 | $5.02 \times 10^4$ |
| Calculated at room temperature, unaged 5 hrs. at 131° C. | 10.66 | 12.5 | $3.88 \times 10^4$ |

The cord adhesion of mixture V containing rayon presents no problem, since adhesion is always better in this case than with nylon. Therefore the adhesion ratio of mixture V has not been demonstrated any further in the case of rayon. Since natural rubber and 1:4-cis-isoprene rubber are chemically identical and mixtures I and II are already natural rubber mixtures, blending qualities between natural rubber and 1:4-cis-isoprene rubber need not be demonstrated. These blending qualities have the same properties and characteristics as pure natural rubber mixtures. If, instead of styrene butadiene rubber, oil stretched styrene butadiene rubber is used in mixtures III and IV the adhesion of the mixture, which has been changed in this manner, is the same as nylon. Otherwise, the other properties of the changed mixtures agree with those of mixtures III, IV. In the following Example IV a mixture VI containing oil stretched styrene butadiene rubber is shown.

EXAMPLE IV

|  | Mixture VI |
|---|---|
| Natural rubber | 50 |
| Oil-extended styrolbutadiene rubber (Buna Huels 302) | 60.8 |
| Zinc Oxide | 3 |
| Stearic acid | 2 |
| N-phenyl-N'-cyclohexyl-p-phenylene-diamine | 1 |
| Decomposition (Renazit IV) agent | 0.06 |
| Phenylbetanaphthylamine (phenyl beta) | 0.6 |
| Phenylalphanaphthylamine (phenyl alpha) | 0.35 |
| Wax | 1 |
| Furnace (Corax 3) carbon black | 42.5 |
| Adhesive (KO resin) | 1 |
| Mercaptobenzimidazol (MB) | 1 |
| Oil sulphur 0.2 | 0.55 |
| Dibenzothiazyldisulphide (Vulkazit M) | 2 |
| Mercaptobenzothiazol (Vulkazit C) | 0.5 |
| Tetramethylthiuramidisulphide (Vulkazit Thiuram) | 0.1 |
| pp'-Dibenzoylquinonedioxime (Dibenzo GMF) | 1.5 |
|  | 175.96 |

| Test Results: | VI Heating at 143 °C. | | | |
|---|---|---|---|---|
|  | 10' | 15' | 35' | 60' |
| Modulus with 300% | 27 | 64 | 68 | 68 |
| Modulus with 500% | 62 | 139 | 146 | 145 |
| Tensile strength | 120 | 172 | 180 | 178 |
| Breaking strength | 770 | 575 | 585 | 620 |
| Shore hardness | 45 | 54 | 53 | 54 |
| Elasticity | 43 | 48 | 47 | 45 |
| Notch toughness | 29 | 27 | 24 | 25 |
| Pulling out strength | 71 | 81 | 75 | 55 |

| Aging 3 days at | VI Heating at 143° C. | | | |
|---|---|---|---|---|
|  | 10' | 15' | 35' | 60 |
| Modulus with 300% | 93 | 104 | 88 | 92 |
| Modulus with 500% |  |  |  |  |
| Tensile strength | 156 | 166 | 162 | 152 |
| Breaking strength | 445 | 435 | 435 | 400 |
| Shore hardness | 58 | 59 | 56 | 57 |
| Elasticity | 48 | 48 | 45 | 42 |
| Notch toughness | 7 | 7 | 6 | 11 |
| Pulling out strength | 30 | 31 | 38 | 40 |

Cord adhesion (static): Nylon
Calculated at room temperature, unaged (heated 2 hrs., 15 mins.) _____ 9.8
Calculated at room temperature, 5 hrs. at 130° C. _____ 8.7

From the above mixtures and test results thereof, it is apparent that the static and the dynamic adhesion between the mixture and nylon cord is good. Even the adhesion with bare nylon cord is improved. In the following the chemical reactions which achieve the improvements obtained by the vulcanisation system of the present invention, are shown.

If the resorcine formaldehyde vinyl pyridine latex solution for impregnating rayon cord contains additionally and simultaneously natural rubber or synthetic latex, more active side chains are available which cause a comparatively large number of chemical bondings. The conventional carcass mixture, in which the sulphur is the main cross linking agent, reacts with such a polymer, i.e. natural rubber or synthetic latex of the solution.

As already known, it is not difficult to establish a bonding between the immersion solution and the rayon cord because of the hydroxyl groups. The original impregnation solution for rayon cord contains latex, which, however, does not interfere with the bonding between the dipping solution and the cord, but on the contrary, is favourable since it forms cross linkings with the sulphur of the carcass mixture.

In the case of nylon cord, on the other hand, the basic difference compared with rayon cord resides in its chemical origin and in its structure. The resorcine formaldehyde solution and vinyl pyridine latex serves only to obtain chemical and physical bonds. But the bond between solution and carcass mixture having sulphur as main cross linking agent does not give the really stable connection, as the above-mentioned tests show. Accordingly, the vulcanisation system contains nitrogen splitting components (e.g. pp'-dibenzoylquinonedioxime) which, as apparent from the above tests is more effective and, with its nitrogen-splitting off substances has the following possibilities of reaction.

The components are effective
(a) with the methylol group of the phenol formaldehyde resin (trade name Amberol St 137),
(b) with the vinyl group of the polymer (vinyl pyridine latex),
(c) with the α-methylene group of isoprene (latex) or the 1-2 position of the vinyl group of the polystyrene butadiene
(d) with the hydroxyl group of rayon and
(e) with the carbomide group (hydrogen) of nylon.

In the conventional method the adhesion between the carcass mixture and the dipping solution of the nylon cord is based on the bond through the methanol group of the resorcine formaldehyde and vinyl pyridine resin. But the number of these active groups is no longer large enough after the reaction with nylon cord for a chemical bond with the carcass quality during the drying operation. This defect is compensated by the addition, in accordance with the present invention, of very active nitrogen splitting off vulcanisation agents. With regard to the individual types of rubber, it may also be pointed out that the presence of styrene butadiene rubber from the carcass mixture is an advantage because this rubber has many groups capable of reaction and inclines to cross linkages which are both chemical and physical bonds. This property of styrene butadiene rubber is a special reason for its suitability in blending within the framework of all other blending possibility mentioned above in connection with the vulcanisation system of the present invention.

Hitherto the use of flue carbon black in rubber mixtures for tire carcasses has been an advantage for increasing the adhesion of these rubber mixtures on impregnated tire cord. As a result of the present invention, furnace and flue carbon black can be used as desired, without the adhesion showing any differences between rubber mixture and tire cord.

I claim:

1. A vulcanizable rubber composition having an improved adhesion to nylon cord made of a rubber selected from the group consisting of (a) natural rubber; (b) a styrene-butadiene elastomer; (c) an oil-extended styrene-butadiene elastomer; (d) a 1,4-cis-polybutadiene elastomer; (e) a blend of natural rubber and at least one of the elastomers at (b), (c) and (d); and (f) a blend of at least two of said elastomers at (b), (c) and (d), the said composition including, in addition to effective amounts of elementary sulphur, carbon black, and at least one age resistor, a combination of accelerators comprising effective amounts of dibenzothiazyldisulphide, mercaptobenzothiazol, and tetramethylthiuramdisulphide, and including an effective amount of a quinone dioxime selected from the group consisting of pp'-dibenzoylquinone dioxime and paraquinone dioxime.

2. The vulcanizable rubber composition of claim 1 which includes a phenol-formaldehyde resin having active methylol groups.

3. The vulcanizable rubber composition of claim 1 wherein the natural rubber and the 1,4-cis-polybutadiene elastomer are present in a ratio of about 70 to 30 parts.

4. The vulcanizable rubber composition of claim 1 wherein the natural rubber and the styrene-butadiene elastomer are present in about equal parts by weight.

5. The vulcanizable rubber composition of claim 1 wherein the natural rubber and the oil-extended styrene-butadiene elastomer are present in a ratio of about 50:68.8 parts by weight.

6. The vulcanizable rubber composition of claim 1 wherein the quinone dioxime compound is present in an amount of about 1.5 parts by weight relative to 100 parts of rubber.

7. The vulcanizable rubber composition of claim 1 wherein the phenol-formaldehyde resin is present in an amount of about 1 part by weight per 100 parts of rubber.

8. The vulcanizable rubber composition of claim 1 wherein the sulfur is present in an amount of about 0.55 to 0.77 part by weight per 100 parts of rubber.

9. The vulcanizable rubber composition of claim 1 wherein the carbon black is present in an amount of about 40 to 43.5 parts by weight per 100 parts rubber.

10. The vulcanizable rubber composition of claim 1 wherein the accelerators are present in about the following amounts (in parts by weight): dibenzothiazyldisulphide 2 to 2.6; mercaptobenzothiazol 0.5; tetramethylthiuramdisulphide 0.1 per 100 parts of rubber.

11. The vulcanizable rubber composition of claim 3 wherein the quinone dioxime compound is present in an amount of about 1.5 parts by weight.

12. The vulcanizable rubber composition of claim 4 wherein the quinone dioxime compound is present in an amount of about 1.5 parts by weight.

13. The vulcanizable rubber composition of claim 5 wherein the quinone dioxime compound is present in an amount of about 1.5 parts by weight.

14. A vulcanizable rubber composition as defined in claim 1, and consisting essentially of about 100 parts of a rubber selected from the group consisting of (a) natural rubber; (b) a styrene-butadiene elastomer; (c) an oil-extended styrene-butadiene elastomer; (d) a 1,4-cis-polybutadiene elastomer; (e) a blend of natural rubber and at least one of the elastomers at (b), (c) and (d); and (f) a blend of at least two of said elastomers at (b), (c) and (d), the said composition including, in addition to effective amounts of elementary sulphur, carbon black, and at least one age resistor, a combination of accelerators comprising about 2 parts dibenzothiazyldisulphide, about 0.5 part mercaptobenzothiazol, and about 0.1 part tetramethylthiuramdisulphide, and including about 1.5 parts of a quinone dioxime selected from the group consisting of pp'-dibenzoylquinone dioxime and paraquinone dioxime.

15. A method of bonding a rubber composition to a nylon cord as defined in claim 14, wherein said rubber composition consists essentially of about 100 parts of a rubber selected from the group consisting of (a) natural rubber; (b) a styrene-butadiene elastomer; (c) an oil-extended styrene-butadiene elastomer; (d) a 1,4-cis-polybutadiene elastomer; (e) a blend of natural rubber and at least one of the elastomers at (b), (c) and (d); and (f) a blend of at least two of said elastomers at (b), (c) and (d), the said composition including, in addition to effective amounts of elementary sulphur, carbon black, and at least one age resistor, a combination of accelerators comprising about 2 parts dibenzothiazyldisulphide, about 0.5 part mercaptobenzothiazol, and about 0.1 part tetramethylthiuramdisulphide, and including about 1.5 parts of a quinone dioxime selected from the group consisting of pp'-dibenzoylquinone dioxime and paraquinone dioxime.

16. A rubber article comprising a rubber composition made of a rubber selected from the group consisting of (a) natural rubber; (b) a styrene-butadiene elastomer; (c) an oil-extended styrene-butadiene elastomer; (d) a 1,4-cis-polybutadiene elastomer; (e) a blend of natural rubber and at least one of the elastomers at (b), (c) and (d); and (f) a blend of at least two of said elastomers at (b), (c) and (d), the said composition including, in addition to effective amounts of elementary sulphur, carbon black, and at least one age resistor, a combination of accelerators comprising effective amounts of dibenzothiazyldisulphide, mercaptobenzothiazol, and tetramethylthiuramdisulphide, and including an effective amount of a quinone dioxime selected from the group consisting of pp'-dibenzoylquinone dioxime and paraquinone dioxime, the said rubber composition being bonded to a nylon cord.

17. A rubber article according to claim 16, wherein said nylon cord is impregnated with a resorcinol-formaldehyde solution and a vinyl pyridine latex.

18. A method of bonding a rubber composition to a nylon cord comprising the step of bonding to said nylon cord a rubber composition made of a rubber selected from the group consisting of (a) natural rubber; (b) a styrene-butadiene elastomer; (c) an oil-extended styrene-butadiene elastomer; (d) a 1,4-cis-polybutadiene elastomer; (e) a blend of natural rubber and at least one of the elastomers at (b), (c) and (d); and (f) a blend of at least two of said elastomers at (b), (c) and (d), the said composition including, in addition to effective amounts of elementary sulphur, carbon black, and at least one age resistor, a combination of accelerators comprising effective amounts of dibenzothiazyldisulphide, mercaptobenzothiazol, and tetramethylthiuramdisulphide, and including an effective amount of a quinone dioxime selected from the group consisting of pp'-dibenzoylquinone dioxime and paraquinone dioxime.

19. A method according to claim 18, wherein before the bonding said nylon cord is impregnated with a resorcinol-formaldehyde solution and a vinyl pyridine latex.

References Cited

UNITED STATES PATENTS

| | | | |
|---|---|---|---|
| 2,128,635 | 8/1938 | Church et al. | 260—3 |
| 2,477,015 | 7/1949 | Sturgis et al. | 260—79 |
| 2,619,481 | 11/1952 | Baldwin et al. | 260—79.5 |

(Other references on following page)

UNITED STATES PATENTS

| | | | |
|---|---|---|---|
| 3,060,989 | 10/1962 | Railsback et al. | 260—5 |
| 3,226,276 | 12/1965 | Rye et al. | 156—335 |
| 3,310,508 | 3/1967 | Roy | 260—5 |

OTHER REFERENCES

Winspear, G. G.: Rubber Handbook, The Vanderbilt Co., New York, (1958), pp. 168, 170, 172 and 249.

MURRAY TILLMAN, Primary Examiner

M. J. TULLY, Assistant Examiner

U.S. Cl. X.R.

260—3, 5, 41.5, 66, 84.5, 79.5; 161—249; 156—334, 306